Inventor:
Malcolm E. Houghton
By: Stone, Nierman, Burmeister and Zummer
Attorneys Inventor:
Malcolm E. Houghton
By: Stone, Niemann, Burmeister and Zummer
Attorneys United States Patent Office 3,363,177

Patented Jan. 9, 1968

3,363,177

TRANSISTOR AMPLIFIER AND MEASURING DEVICE

Malcolm E. Houghton, Bensenville, Ill., assignor, by mesne assignments, to Bell & Howell Company, a corporation of Illinois Filed Aug. 6, 1963, Ser. No. 300,278
2 Claims. (Cl. 324—123)

The present invention relates to meters for measuring electrical voltages and electrical currents, and particularly to meters employing an electronic amplifier in combination with a current sensitive electromechanical indicator.

The electronic industry has long used voltage measuring devices which employ an electronic amplifier in combination with an electromechanical indicator or meter. Such measuring devices have employed vacuum tubes in the amplifier thereof and have the advantage of greater sensitivity, higher input impedance, and greater versatility than can be obtained with a simple electromechanical indicator.

The present invention is directed to a combination electronic amplifier and electromechanical indicator in which the amplifier employs transistors rather than vacuum tubes. Vacuum tubes are generally considered to be voltage responsive devices while transistors are considered to be current responsive devices. Hence, measuring devices employing vacuum tube amplifiers and electromechanical indicators are primarily useful in the measurement of voltages while prior to the present invention measuring devices employing transistor amplifiers and electromechanical indicators have been useful primarily in the measurement of electrical currents. It is an object of the present invention to provide a measuring device employing a transistor amplifier which effectively responds to electrical potentials as well as to electrical currents.

Measuring devices which employ amplifiers and electromechanical indicators are extremely sensitive, and the electromechanical indicators of such devices are readily damaged by overloads. It is a further object of the present invention to provide a combination transistor amplifier and an electromechanical indicator which inherently protects the electromechanical indicator from damage due to overloads.

Many transistor circuits have characteristics which vary greatly with different transistors, and this is particularly true of balanced amplifier circuits which are particularly suitable for use in driving an electromechanical indicator. It is a further object of the present invention to provide an amplifier circuit suitable for use in a measuring instrument which employs transistors and which is relatively insensitive to changes and differences in transistor characteristics.

Additionally, it is an object of the present invention to provide an improved transistor amplifier suitable for use in a measuring instrument which is responsive to voltage and which produces an output increasing linearly with increased voltage.

Figure 1:
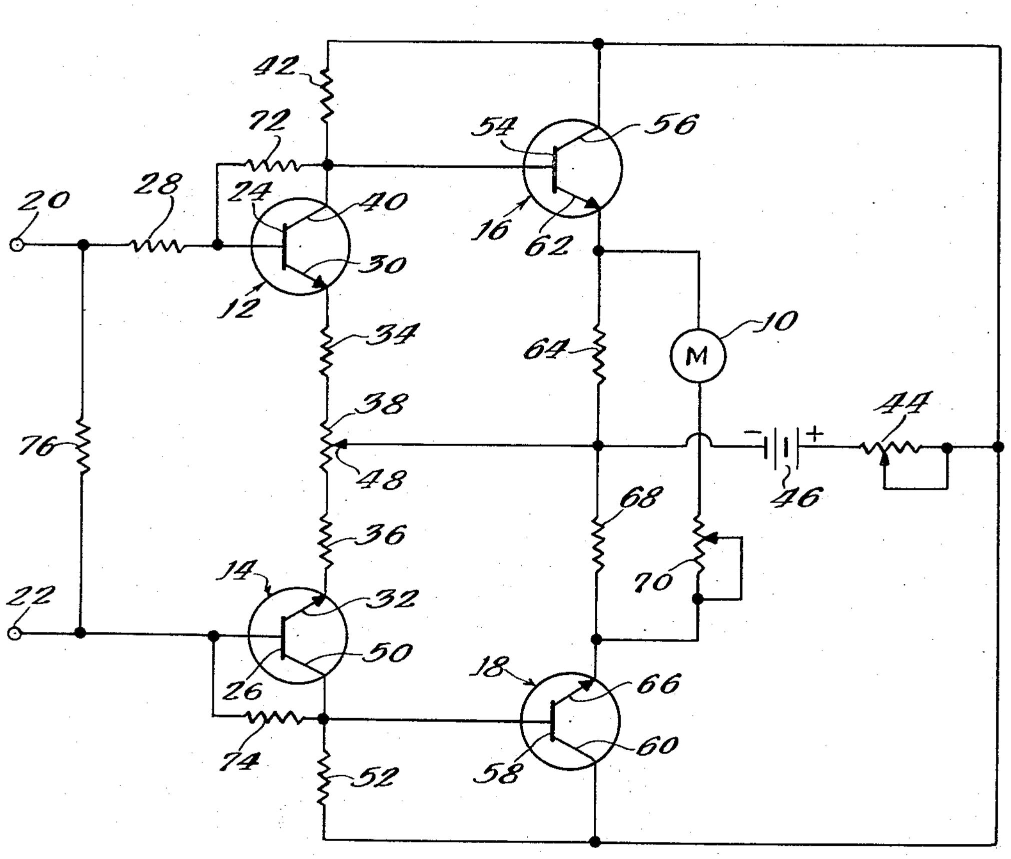
Figure 2:
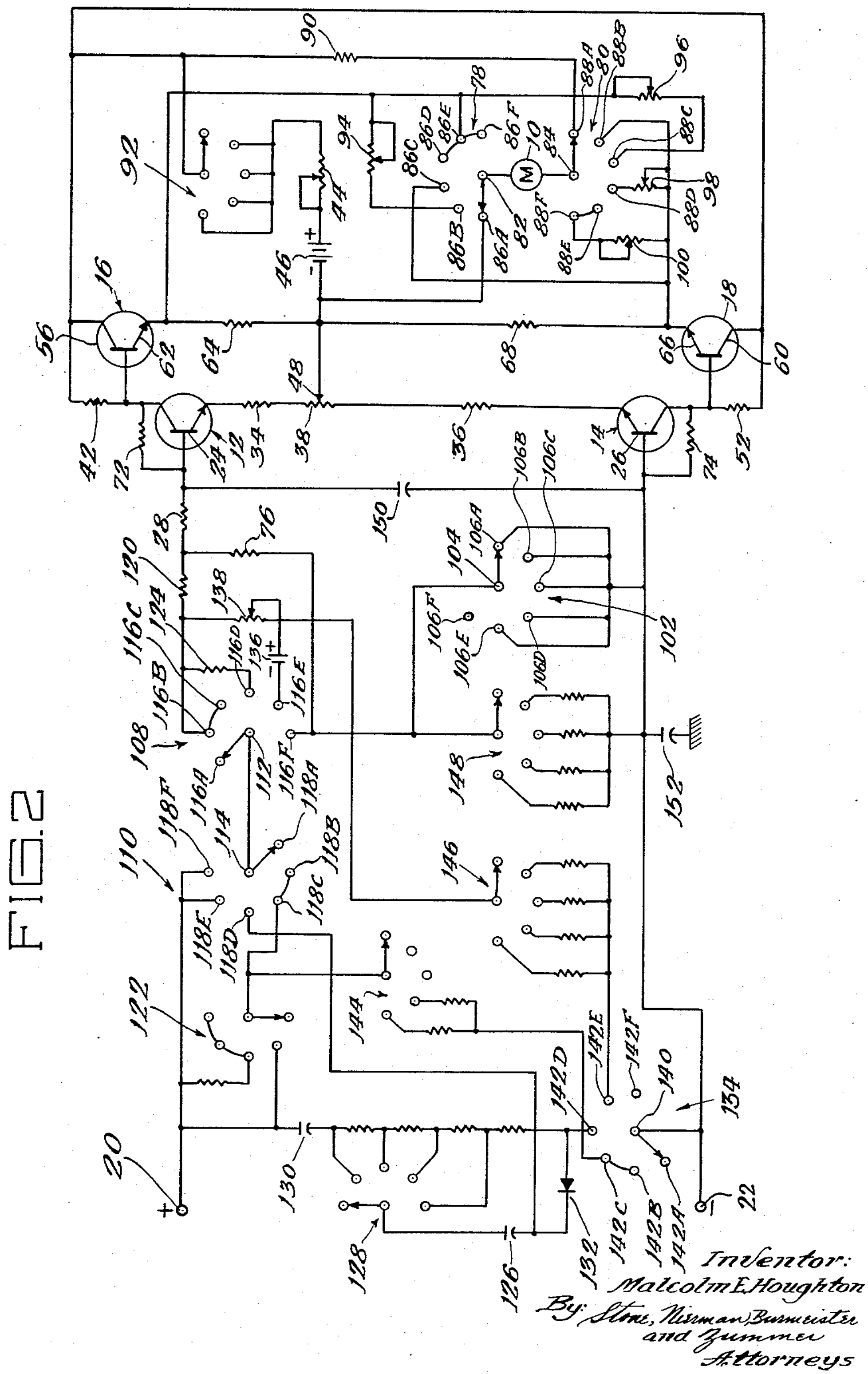

These and further objects of the present invention will become readily apparent to those skilled in the art from a further consideration of this disclosure, particularly when viewed in the light of the drawings, in which:

FIGURE 1 is a schematic electrical circuit diagram of a measuring device employing a transistor amplifier and an electromechanical indicator according to the present invention; and FIGURE 2 is a commercial embodiment of a measuring device employing the present invention.

Referring to FIGURE 1, the measuring device has an electromechanical indicator or meter 10 which may conventionally be a D'Arsonval movement. The meter 10 is responsive to current flow and in a particular construction of the present invention produces a full scale response to a one milliampere current. The meter 10 is driven by a two stage transistor amplifier employing a first pair of transistors designated 12 and 14 and a second pair of transistors designated 16 and 18.

The electrical signal to be measured is connected to a pair of input terminals 20 and 22, and the input terminals 20 and 22 are electrically connected to the bases 24 and 26 of the transistors 12 and 14, respectively. A resistor 28 is connected in series with the input terminal 20 and the base 24 of the transistor 12.

The emitters 30 and 32 of the transistors 12 and 14 are electrically interconnected by a pair of resistors 34 and 36 and a potentiometer 38 connected in series. The collector 40 of transistor 12 is connected in a collector to emitter circuit including a resistor 42 connected to the collector 40, an adjusting potentiometer 44, and a battery 46 which is connected between the potentiometer 44 and an adjustable tap 48 on the potentiometer 38. In like manner, the collector 50 of transistor 14 is connected in a collector to emitter circuit including a resistor 52, the potentiometer 44, the battery 46, and the adjustable tap 48 of the res'stor 38.

Transistor 16 has a base 54 which is directly connected to the collector 40 of transistor 12, and also the transistor 16 has a collector 56 which is connected to the junction between the resistor 42 and the potentiometer 44. In like manner, the transistor 18 has a base 58 directly connected to the collector 50 of the transistor 14, and a collector 60 connected to the junction between the resistor 52 and the potentiometer 44. Transistor 16 has an emitter 62 connected to the adjustable tap 48 of the resistor 38 by a resistor 64, and transistor 18 has an emitter 66 connected to the adjustable tap 48 of the potentiometer 38 by a resistor 68. The meter 10 is connected in parallel with resistors 64 and 68, and a calibration potentiometer 70 is connected in series with the meter 10.

Operation of the meter may best be described by assuming that a direct current potential has been placed across the input terminals 20 and 22 making the terminal 20 positive with respect to the terminal 22. It is however to be understood that the meter will operate in an identical fashion if the polarities are reversed. As a result, the base 24 of transistor 12 becomes more positive and the current flowing between the collector 40 and emitter 30 is increased. At the same time, the base 26 of transistor 14 becomes less positive, thereby decreasing the flow of current from the collector 50 to the emitter 32. The result of this change in current flowing through the transistors 12 and 14 is to decrease the potential of the base 54 of the transistor 16 and increase the potential of the base 58 of the transistor 18. Hence, the current flowing from the collector 56 to the emitter 62 of transistor 16 decreases while the current flowing from the collector 60 to the emitter 66 of the transistor 18 increases. As a result, the voltage drop across resistor 68 increases while the voltage drop across resistor 64 decreases. Since the voltage drops across these resistors 64 and 68 are bucking, a potential difference is developed across the meter 10 causing an indication of the magnitude of the charge placed on the input terminals 20 and 22.

The first pair of transistors 12 and 14 have their bases 24 and 26 forward biased to provide a small no signal bias current in the base to emitter circuit. The base 24 is biased slightly positive through the resistor 42 and a feed back resistor 72 connected between the base 24 and collector 40 of the transistor 12. In like manner, the base 26 of transistor 14 is biased positively through resistor 52 and a feed back resistor 74 connected between the base 26 and collector 50 of the transistor 14. When a sufficiently large potential is applied to the input terminals 20 and 22 with the negative charge impressed upon the base 26 of transistor 14, the base to emitter potential of transistor 14 will fall sufficiently to cut off the flow of emitter to collector current in this transistor. Larger potentials placed upon the input terminals 20 and 22 will therefore be isolated from transistor 18. Also, the collector to emitter current of transistor 12 produces the potential drop across resistor 42, and as this current increases, the potential of the base 54 of transistor 16 falls. The collector to emitter current of transistor 16 declines with a falling base potential, thus decreasing the voltage drop across resistor 64. Hence, larger signal voltages placed across the input terminals 20 and 22 result in a falling potential on base 54 of transistor 16 and a falling potential on emitter 62 of transistor 16. When the potential difference between the base 54 and emitter 62 of transistor 16 approaches the vicinity of zero potential, the transistor 16 will become cut off, and further increases in the input potential applied to terminals 20 and 22 will be ineffective. The base bias current in the absence of signal on the base 26 of transistor 14 is selected to achieve cut off for transistor 14 at approximately the same point as is achieved for transistor 16. In other words, resistors 52 and 74 are selected to cut off transistor 14 for approximately the same input potential applied to the terminals 20 and 22 as will cut off the flow of current through transistor 16, the latter cut off being effected by the resistor 42, the resistor 64, and the characteristics of the circuit of transistor 12. Also, if a negative potential is placed on the terminal 20 and the corresponding positive potential on the terminal 22, the corresponding resistors in the circuit of transistor 12 and transistor 18 will achieve cut off of these transistors. In this manner, the maximum current which can flow through the meter 10 is limited, and the meter is protected from excessive overloads. In actual practice, the maximum unbalanced current through the meter 10 is limited to 300 percent to 400 percent of full scale current for the meter, which will not injure the meter.

The resistors 72 and 74 which extend between the collectors and bases of the transistors 12 and 14 provide two separate functions. As described above, these resistors place a forward bias on the bases 24 and 26 of the transistors 12 and 14 to establish the desired operating points. Further, the resistors 72 and 74 provide a negative feed back from the collectors to the bases of the transistors 12 and 14. The negative feed back achieved through these feed back paths and also by virtue of the emitter resistors 34 and 36 substantially increases the input impedance of the amplifier. Also, the transistors 12 and 14 are operated at very low forward base bias for this purpose. Using low leakage transistors 12 and 14, high input resistance between the bases 24 and 26 of the order of 80,000 ohms and higher may readily be achieved. Further, the resistance of resistor 28 to terminal 20 is added thereto.

The amplifier may be operated over widely different input impedances without substantially changing its operating characteristics. In this manner, a relatively large resistance may be maintained between the terminals 20 and 22 for the measurement of voltage, or a relatively small resistance may be maintained between these terminals for the measurement of electrical currents. A resistor 76, which may be adjustable in practice, is illustrated connected between the terminals 20 and 22 for this purpose. The resistor 76 tends to equalize the potentials applied to the bases 24 and 26 of the transistors 12 and 14, but it does not affect the base bias on these transistors. Hence, the value of the resistor 76 does not affect the operating characteristics of the amplifier.

There are three adjustments available to assure accurate readings from the electromechanical indicator 10. First, potentiometer 44 reduces the electromotive force applied to the transistor circuits from the battery 46 to a fixed pre-determined level to establish the proper current relationships in the circuit. Second, potentiometer 38 has the adjustable tap 48 for the purpose of providing zero current through the meter 10 in the absence of a signal across the terminals 20 and 22. Changes in the electrical characteristics of the transistors 12 and 14 may be nulled by means of adjustment of the tap 48 on the potentiometer 38. Third, potentiometer 70 is adjusted to establish full current deflection of the indicator or meter 10.

FIGURE 2 illustrates a commercial embodiment of the present invention, and those components of the measuring device of FIGURE 2 which correspond identically to those of FIGURE 1 bear the same reference numerals. The portions of the voltage and current measuring device of FIGURE 2 which are identical to that described in FIGURE 1 will not be described in detail, but only additional components which are necessary to provide a meter for the measurement of microamperes, ohms, alternating currents, direct currents and for making the initial adjustments will be described.

A pair of single pole six position switches 78 and 80 are electrically connected in the circuit of the meter 10, the meter 10 being connected to the pole terminal 82 of switch 78 and the pole terminal 84 of switch 80. Switch 78 has stationary terminals 86A, 86B, 86C, 86D, 86E, and 86F, while switch 80 has stationary terminals 88A, 88B, 88C, 88D, 88E, and 88F. Switches 78 and 80 are ganged together so that the meter 10 is electrically connected between stationary terminals 86A and 88A, or 86B and 88B, or 86C and 88C, etc. Terminal 86A is electrically connected to the tap 48 of potentiometer 38, and terminal 88A is electrically connected to the collectors 56 and 60 through a resistor 90. When the switches 78 and 80 are in this position, the battery 46 is connected in series with the meter 10 by means of a third single pole six position switch 92 to be described hereinafter so that the potential of the battery may be adjusted by the rheostat 44 to establish the proper electrical characteristics of the circuit.

Terminal 86B is electrically connected to the emitter 62 of transistor 16, as described in FIGURE 1, in series with an adjusting rheostat 94, and terminal 88B is directly connected to the emitter 66 of transistor 18. With the switches 78 and 80 in this position, the meter 10 will read direct current potentials assuming the positive potential is applied to terminal 20. Stationary pole 86C of switch 78 is connected to the emitter 66 of transistor 18, and stationary pole 88C is connected in series with an adjusting rheostat 96 to the emitter 62 of transistor 16. When the meter 10 is connected between these stationary poles it will read direct current potentials assuming the negative potential is applied to input terminal 20.

Stationary poles 86D, 86E, and 86F are interconnected and electrically connected to the emitter 62 of transistor 16. Stationary pole 88D is electrically connected to the emitter 66 of transistor 18 through an adjusting rheostat 98, and stationary poles 88E and 88F are interconnected and connected to the emitter 66 of transistor 18 through a second adjusting rheostat 100. When the meter is electrically connected between stationary poles 88D and 86D, it is calibrated for the measurement of electrical currents, and when it is electrically connected between the stationary poles 86F and 88F it is calibrated for reading microamperes of electrical current. The rheostat 98 is to calibrate in terms of alternating currents and the rheostat 100 is for calibrating in terms of microamperes.

A third single pole six position switch 102 has a pole terminal 104 connected in series with a resistor 76 across the input circuit of the amplifier and may be also ganged with the switches 78 and 80. The switch 102 has stationary pole terminals 106A, 106B, 106C, 106D, 106E, and 106F. The stationary terminals are all interconnected and connected to the base 26 of transistor 14 except for terminal 106F which is not utilized. In all positions of the switch 102 except when utilizing the pole terminal 106F, the resistor 76 is connected as shown in FIGURE 1, the F position being utilized for the measurement of microamperes.

A fourth single pole six position switch 108 is connected in series with a fifth six position switch 110 between the base of the transistor 12 and the input terminal 20. The switch 108 has a pole terminal 112 which is electrically connected to a pole terminal 114 of the switch 110. Switch 108 also has stationary terminals 116A, 116B, 116C, 116D, 116E, and 116F, and switch 110 has stationary terminals 118A, 118B, 118C, 118D, 118E, and 118F. The stationary terminal 116A of switch 108 and the stationary terminal 118A of the switch 110 have no connection to other portions of the circuit, but the stationary terminals 116B and 116C are electrically connected to the terminal of the resistor 28 opposite the transistor 12 through a resistor 120. Also, the stationary terminals 118B and 118C of switch 110 are electrically interconnected and connected to the input terminal 20 in series with an electrical switch 122 to be described hereinafter. The switches 108 and 110 are ganged with the switches 78, 80, 102, and when in the A position disconnect the input terminal 20 from other elements of the circuit during the meter checking process. When in the B position or C position direct current potentials are transmitted from the terminal 20 through the switch 122, the switches 108 and 110 to the transistor 12. The terminal 116D of switch 108 is connected to the terminals 116B and C through a resistor 124, and the stationary terminal 118B is connected to the input terminal 20 through a capacitor 126, a multi-position switch 128, and a second capacitor 130 for the measurement of alternating current potentials. A diode 132 is connected between the stationary terminal 118D and the input terminal 22 through a multi-position switch 134 to be described hereinfater. The diode 132 rectifies the alternating current potentials so that a direct current potential is placed on the base of the transistors 12 and 14. Stationary terminal 116E of switch 108 is electrically connected to terminal 116B through a battery 136 and adjusting rheostat 138 connected in series. Stationary terminal 118E is electrically connected directly to the input terminal 20. When the switches 78, 80, 102, 108, and 110 are in the E position, a resistance placed across the input terminals 20 and 22 will decrease the potential appearing across the bases of the transistors 12 and 14 as a result of the battery 136 for the measurement of electrical resistance. The terminal 116F of the switch 108 is directly connected in series with the resistor 76, and the terminal 118F is directly connected to the input terminal 20 for connecting a microampere current source in series with the resistors 120 and other calibrating resistors for the measurement of microamperes.

The switch 134 has a pole terminal 140 and stationary terminals 142A, 142B, 142C, 142D, 142E, and 142F. The terminal 142D is utilized as explained above in the measurement of alternating current potentials. The terminals 142B and 142C are interconnected and connected in series with a resistance selection switch 144 for selecting shunt resistors for the measurement of direct current potentials. In addition, other shunt resistors may be connected across the input of the direct current amplifier by means of multi-position switches 146 and 148 and the resistors associated with these switches.

A capacitor 150 is connected across the bases 24 and 26 of the transistors 12 and 14 for the purpose of providing a time lag following impression of a potential across the terminals 20 and 22 in order to further protect the meter 10. By slowing the rate of rise of the needle of the meter 10, it is less likely to be damaged by a sudden overload. Another capacitor 152 couples the base 26 of the transistor 14 to a common ground in order to bypass spurious charges from the direct current amplifier circuit.

As is apparent from the above disclosure, a combination direct current amplifier and electromechanical indicator has been provided which is capable of measuring electrical currents over a considerable range including very small electrical currents. Also, the volt meter described herein is capable of measuring voltages over a wide range of both positive and negative polarity and alternating current potentials as well. Additionally, this measuring device measures resistance.

The following table sets forth the values of the components used in a preferred construction of the present invention which is illustrated schematically in FIGURE 2 of the drawings:

| | | |
|---|---|---|
| Resistor **28** | ohms | 220,000 |
| Resistor **72** | megohms | 2.2 |
| Resistor **74** | do | 2.2 |
| Transistors **12**, **14**, **16** and **18** | | (1) |
| Resistors **42** and **52** | ohms | 18,000 |
| Resistors **34** and **36** | do | 560 |
| Potentiometers **38** | do | 1500 |
| Resistor **76** | do | 120,000 |
| Resistors **64** and **68** | do | 560 |
| Potentiometer **70** | do | 1000 |
| Meter **10** | | (2) |
| Battery **46** | volts | 4.5 |
| Potentiometer **44** | ohms | 150 |

[1] General Electric 2N–336 transistors.
[2] 1.0 milliammeter (full scale), 50 ohms resistance.

Those skilled in the art will readily devise many modifications to the embodiment of the present invention herein before set forth. Further, many applications of the present invention will occur to those skilled in the art. It is therefore intended that the scope of the present invention be not limited by the foregoing disclosure, but rather only by the appended claims.

The invention claimed is:

1. A device for measuring electrical potentials and currents comprising, in combination: a push-pull amplifier having a first pair of transistors each having a base, a collector, and an emitter, resistance means interconnecting the emitters of the transistors of the first pair including an adjustable tap, means connected to the first pair of transistors to provide independent base-emitter bias currents in each transistor of the first pair consisting of a first pair of resistors, a second pair of resistors and a direct current power source, the first of the resistors of said first pair being electrically connected between the base and collector of the first transistor of the first pair of transistors and the second resistor of the first pair being electrically connected between the base and collector of the second transistor of the first pair of transistors, the first of said resistors of the second pair being electrically connected in a series circuit between the collector of the first transistor of the first pair of transistors and the tap of the resistance means and including the power source, the second resistor of the second pair of resistors being electrically connected in a series circuit, between the collector of the second transistor of the first pair of transistors and the tap of the resistance means and including the power source; a push-pull transistor follower having a second pair of transistors each having a base, a collector and an emitter, the base of the first transistor of the second pair being electrically directly connected to the collector of the first transistor of the first pair, the base of the second transistor of the second pair being electrically directly connected to the collector of the second transistor of the first pair, the collector and emitter of the first transistor of the second pair being connected in a series circuit with the first resistor of a third pair of resistors and the power source, and the collector and emitter of the second transistor of the second pair being connected in a series circuit with the second resistor of the third pair of resistors and the power source, the third pair of resistors being connected in series between the emitters of the transistors of the second pair, and a current responsive meter connected between the emitters of the second pair of transistors.

2. A device for measuring electrical potentials and currents comprising the combination of claim 1 wherein the base of the first transistor of the first pair is biased relative to the emitter of said transistor to cut off the flow of current between the collector and emitter of said transistor for potentials greater than a threshold value applied between the bases of the transistors of the first pair; and the base of the second transistor of the second pair is biased relative to the emitter of said transistor to cut off the flow of current between collector and emitter of said transistor for potentials greater than said threshold value applied between the bases of the transistors of the first pair.

References Cited

UNITED STATES PATENTS

| | | | |
|---|---|---|---|
| 2,959,741 | 11/1960 | Murray | 330—15 X |
| 3,239,780 | 3/1966 | Echarti | 330—15 X |

FOREIGN PATENTS

| | | |
|---|---|---|
| 1,002,029 | 2/1957 | Germany. |

OTHER REFERENCES

General Electric Transistor Manual, Sixth Edition, March 1962, pp. 104–105.

Neale, D. M., et al., "Transistor D.C. Amplifier"; Wireless World; November 1956; page 531.

RUDOLPH V. ROLINEC, *Primary Examiner.*

W. CARLSON, *Examiner.*

G. LETT, E. KARLSEN, *Assistant Examiners.*